United States Patent [19]

Hamel et al.

[11] Patent Number: 4,525,784
[45] Date of Patent: Jun. 25, 1985

[54] STEERING AND STABILIZATION SYSTEM FOR VEHICLES

[75] Inventors: Peter Hamel; Rüdiger Karmann, both of Brunswick, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 640,531

[22] Filed: Aug. 13, 1984

Related U.S. Application Data

[63] Continuation of Ser. No. 359,001, Mar. 17, 1982, abandoned, which is a continuation-in-part of Ser. No. 126,434, Mar. 3, 1980, abandoned.

[51] Int. Cl.³ .................. G05D 1/06; G01C 17/38; G06F 15/50
[52] U.S. Cl. ...................... 364/434; 364/571
[58] Field of Search ............... 364/424, 432, 433, 434, 364/571

[56] References Cited

U.S. PATENT DOCUMENTS

| | | | |
|---|---|---|---|
| 3,681,583 | 8/1972 | Kubo et al. | 364/434 |
| 3,765,621 | 10/1973 | Shigehara | 364/434 X |
| 3,834,653 | 9/1974 | Perkel | 364/434 X |
| 4,101,958 | 7/1978 | Patterson et al. | 364/434 X |
| 4,115,847 | 9/1978 | Osder et al. | 364/424 X |
| 4,124,897 | 11/1978 | Martin | 364/424 X |
| 4,174,819 | 11/1979 | Brüderle et al. | 364/434 X |
| 4,321,678 | 3/1982 | Krogmann | 364/434 X |

FOREIGN PATENT DOCUMENTS

2843034  8/1980  Fed. Rep. of Germany ...... 364/434

OTHER PUBLICATIONS

Pietila et al.: A Vector Autopilot System, IEEE Transactions on Aerospace and Electronic Systems, vol. AES-12, No. 3, May 1976, pp. 341-347.

Primary Examiner—Felix D. Gruber
Attorney, Agent, or Firm—Salter & Michaelson

[57] ABSTRACT

A steering and stabilization system for an aircraft or other vehicle including a device, for the determination of attitude of the vehicle, in which three, or alternatively, two magnetometers are mounted in the vehicle with respect to the direction of its fore-and-aft axis to determine each co-ordinate of a set of three orthogonal co-ordinates of attitude of the vehicle and in which the orthogonal co-ordinates determined by the magnetometers are transformed into respective geodetic co-ordinates. The system also includes an additional sensor of attitude to provide supplementary information relating to one of the co-ordinates of attitude determined by the magnetometers, and a microcomputer by which signals representative of the transformed co-ordinates and signals representative of the supplementary information are coupled and control signals, required for a control and adjustment system of the vehicle, are calculated in accordance with signals representative of a predetermined motion of the vehicle with which the microcomputer has been programmed.

9 Claims, 6 Drawing Figures

STEERING AND STABILIZATION SYSTEM FOR VEHICLES

This is a continuation of application Ser. No. 06/359,001 filed Mar. 17, 1982, which is a continuation-in-part of application Ser. No. 06/126,434 filed Mar. 3, 1980, both abandoned.

BACKGROUND OF THE INVENTION

The invention relates to a steering and stabilisation system for vehicles, particularly, but not exclusively, aircraft and ships, including means for the determination of attitude of a vehicle of the type comprising at least two magnetometers so mounted in the vehicle with respect to the direction of the fore-and-aft axis thereof as to determine each co-ordinate of a set of three orthogonal co-ordinates of attitude of the vehicle; means for the transformation of the orthogonal co-ordinates determined by the magnetometers into respective geodetic co-ordinates, and an additional sensor of attitude to provide supplementary information relating to one of the co-ordinates of attitude determined by the magnetometers.

Attitude determining means of the above-mentioned type having three magnetometers are known from the paper by R. Pietila and W. R. Dunn, Jr.—"A Vector Autopilot System" in IEEE transactions of Aerospace and Electronics Systems, Vol AES-12, No. 3, May 1976. They are characterised by the fact that it is possible to use constructional elements of low cost to produce a sufficiently accurate system and also an assembly which occupies a small volume.

It is an object of the invention to devise a steering and stabilisation system employing attitude-determining means of the aforesaid type and which has a small installation volume and can be manufactured at low cost.

SUMMARY OF THE INVENTION

According to the invention, a steering and stabilisation system for a vehicle including means for the determination of attitude of the vehicle comprising at least two magnetometers so mounted in the vehicle with respect to the direction of the fore-and-aft axis thereof as to determine each co-ordinate of a set of three orthogonal co-ordinates of attitude of the vehicle, and an additional sensor of attitude to provide supplementary information relating to one of the co-ordinates of attitude determined by said magnetometers, the system also including a microcomputer including input means to receive data of the earth's magnetic field, namely the inclination, declination and total intensity, relating to the operational region of the vehicle, and input means for the input of said magnetometers and said additional sensor, said microcomputer being programmed for the transformation of the orthogonal co-ordinates determined by said magnetometers into respective geodetic co-ordinates by said computer during use of the system, signals representative of said transformed co-ordinates and signals representative of said supplementary information are coupled and control signals, required for a control and adjustment system of the vehicle, are calculated.

Said computer may be programmed for a predetermined motion of the vehicle and include input means for receiving the data of a predetermined course of said motion.

The programme of the course of motion may be dependent on time and/or on location and/or on route.

Each said magnetometer may be provided with means for a magnetic field null point compensation, said means being controlled depending on a predetermined course of the vehicle programmed in the microcomputer. For this purpose the core of each said magnetometer may be provided with means for compensating the output of the sensor coil, by a compensating current derived from a compensation potentiometer. Especially the core of each said magnetometer may be provided with a compensating coil being fed by said compensating current.

The steering and stabilisation system may include further means generating supplementary signals depending of the rate of change in angle of attitude and time differentials said signals being fed into the microcomputer for damping purposes.

Alternatively according to the invention a steering and stabilisation system for a vehicle including means for the determination of attitude of the vehicle comprising at least two magnetometers mounted in the vehicle and fixed with respect to the direction of the fore-and-aft axis thereof as to determine each co-ordinate of a set of three orthogonal co-ordinates of attitude of the vehicle, and an additional sensor of attitude to provide supplementary information relating to one of the co-ordinates of attitude determined by said magnetometers, the system also including a resistor network with three resistors in connection with an operation amplifier, two of the resistors being connected to the output of the magnetometer and the output of the additional sensor, said two resistors being connected to the input of the operation amplifier, the output of the operation amplifier being connected with the input of a control system controlling the adjustment system of the vehicle. Each said magnetometer may be provided with means for a magnetic field null point compensation.

BRIEF DESCRIPTION OF THE DRAWINGS

The steering and stabilisation system according to the invention is illustrated by way of example in the accompanying drawings and is described in detail in the following with reference to the circuit diagram.

DESCRIPTION OF THE PREFERRED EMBODIMENTS

For the determination of the actual attitude of an aircraft 12 a sensor 2 is provided which is designed as a magnetometer system having three fixed magnetometers (i.e., a triple or triaxial magnetometer) built into the aircraft with axes at right angles to each other and one of the axes lying in the direction of the fore-and-aft axis of the aircraft, thereby to determine a set of three orthogonal co-ordinates of attitude of the vehicle. It is alternatively possible to use, instead of an orthogonal triaxial magnetometer system, a biaxial system capable of pivoting through 90° about the vertical axis (z-axis) i.e. the axis of yaw$^\psi$ in the form of an x-z or y-z system but otherwise fixed with respect to the fore-and-aft axis of the aircraft. In the tri-axial system the choice between the x- and y- components is made in accordance with the course, since in the East-West direction the course determination is preferably carried out by means of the x-z magnetometer components while in the North-South direction the determination of course is preferably carried out by means of the y-z magnetometer components.

In addition to the sensor 2 which includes the magnetometer system, there is an additional sensor 4 which generates the supplementary information for one of the three flight attitudes and which is necessary, in addition to the output signals of the magnetometers, for the unambiguous determination of the flight attitude. A pendulum may be used as the additional sensor. It is, however, also possible to use a sensor which responds to the earth's electric field.

The output signals of the sensor 2 and of the additional sensor 4 are fed to a micro computer 6. Data of the earth's magnetic field for the operating region of the aircraft, namely the inclination, declination and total intensity, are fed to the computer 6 as standards. The components of the earth's magnetic field recorded by the magnetometer system are transformed into geodetic co-ordinates in the computer with the aid of the stored values of the earth's magnetic field.

The sensor 2 is mounted in a fixed position in the body of the aircraft and so the transformation of co-ordinates which occurs is from coordinates fixed with respect to the earth's magnetic field to co-ordinates fixed with respect to the aircraft body.

Figure 1:
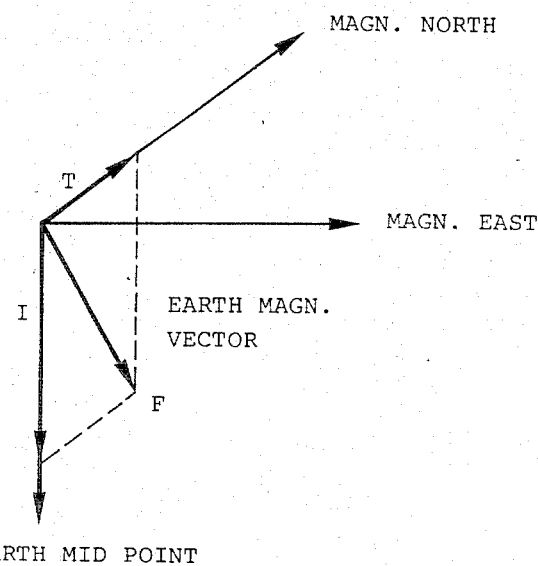
FIG. 1 shows the components of the earth magnetic field.
Figure 2:
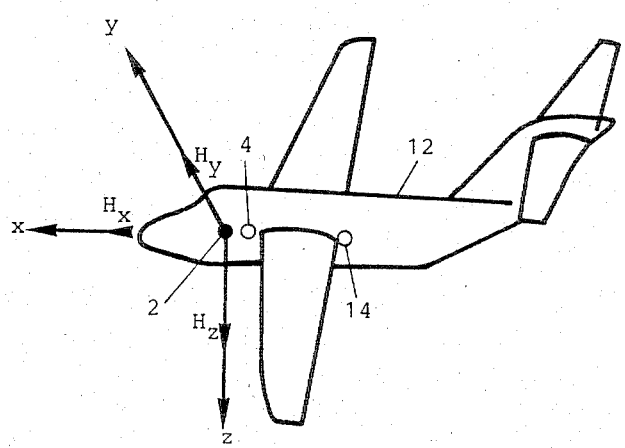
FIG. 2 shows an aircraft with a magneto-meter sensor and an additional sensor.
Figure 3:
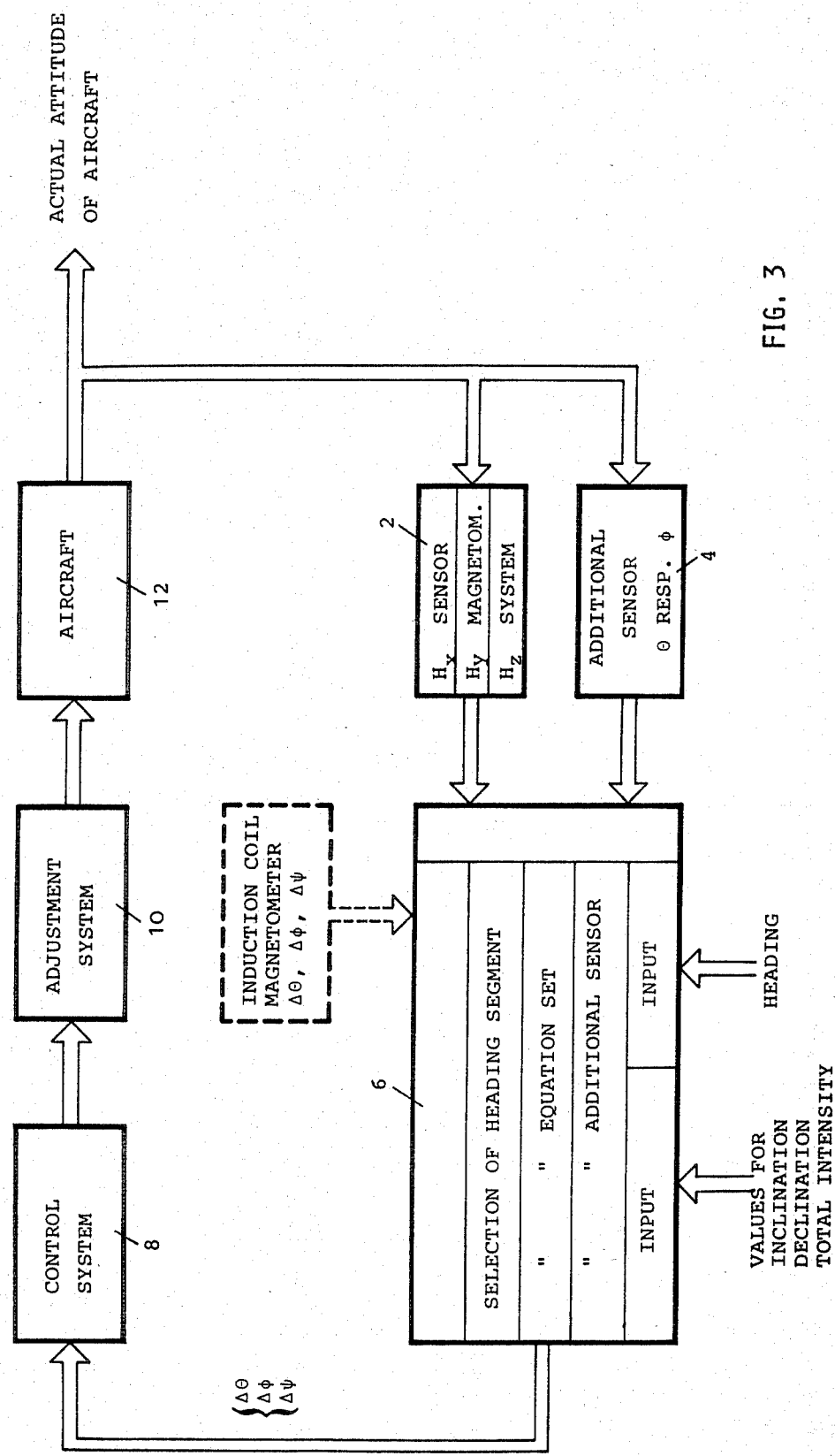
FIG. 3 is a block diagram of the steering and stabilisation system of an aircraft.

The vector of the earth magnetic field $\vec{F}$ can be divided into the components I (direction earth mid-point) and T (direction magnetic north) as shown in FIG. 1. Between the magnetic field components $H_x$, $H_y$, $H_z$ (see FIG. 2) which are measured in the vehicle co-ordinate system and the earth magnetic field components I, T, there is together with the standardization $$h_x = \frac{H_x}{F} \quad h_y = \frac{H_y}{F} \quad h_z = \frac{H_z}{F} \tag{1}$$

$$t = \frac{T}{F} \quad i = \frac{I}{F}$$

the following relationship:

$h_x = t \cos\theta \cos\psi - i \sin\theta$ $h_y = t(-\cos\phi \sin\psi + \sin\phi \sin\theta \cos\psi) + i \sin\phi \cos\theta$ $h_z = t(\sin\phi \sin\psi + \cos\phi \sin\theta \cos\psi) + i \cos\phi \cos\theta.$ (2)

In this equation system only two equations are linearly independent from each other so that for definite determination of $\theta$, $\phi$ and $\psi$ from $h_x$, $h_y$, $h_z$ at least one of the three angles $\theta$ or $\phi$ or $\psi$ must be known and has to be derived from the additional sensor 4. For stabilization of the vehicle it is only necessary that the relative small angle deviations $\Delta\theta$, $\Delta\phi$, $\Delta\psi$ of a given operating point $\theta_o$, $\phi_o$, $\psi_o$ are known. An often occuring application is for example for aircraft $\theta_o = \phi_o = 0$ and $\psi_o$ for any course programming. In this case will be $\Delta h_x = -t \cdot \Delta\psi \cdot \sin\psi_o - i \cdot \Delta\theta$ $\Delta h_x = -t \cdot \Delta\psi \cos\psi_o + i \cdot \Delta\phi$ $\Delta h_z = t \cdot (\Delta\phi \cdot \sin\psi_o + \Delta\theta \cdot \cos\psi_o).$ (3)

If $\Delta\theta$ (measured by additional sensor) is given, one is obtaining $$\Delta\psi = -\frac{\Delta h_x + i\Delta\theta}{t \cdot \sin\psi_o} \tag{4}$$

$$\Delta\phi = \frac{\Delta h_z - t\Delta\theta \cos\psi_o}{t \cdot \sin\psi_o}$$

$\Delta\psi$ and $\Delta\phi$ will be indefinite for $\psi_o \to 0$. Therefore it is necessary to use an additional $\theta$-sensor, suitable for the course ranges $45° \leq \psi_o \leq 135°$ respectively $225° \leq \psi_o \leq 315°$.

If $\Delta\phi$ is given $$\Delta\psi = -\frac{\Delta h_y + i \cdot \Delta\phi}{t \cdot \cos\psi_o} \tag{5}$$

$$\Delta\theta = \frac{\Delta h_z - t \cdot \Delta\phi \cdot \sin\psi_o}{t \cdot \cos\psi_o}$$

In this case the additional sensor has to be used suitable for the course range $-45° < \psi_o < 45°$ respectively $135° < \psi_o < 225°$.

In addition, rated values for the attitude and the course of the aircraft can be fed into the computer. such rated values may, for example, stipulate a horizontal straight-line flight of the aircraft. It is, however, also possible to feed a time-dependent and/or a location- or route-dependent programme to the computer for compound navigation with the computer measuring velocity and time and calculating the corrected values for I and T based on the stored map of the magnetic field.

Figure 4:
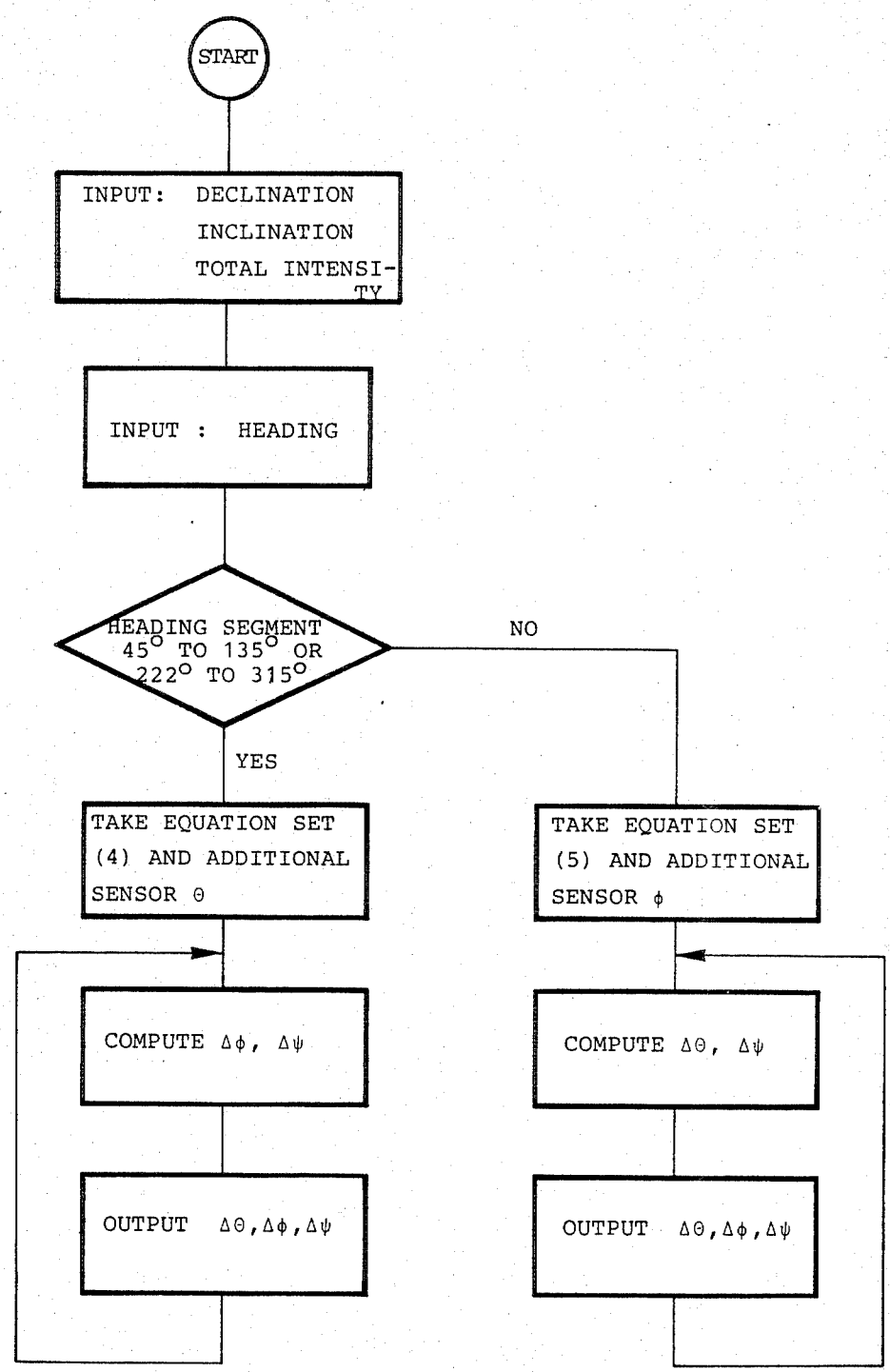
FIG. 4 is a flow chart of the calculation routine of the microcomputer.

The transformed magnetometer signals are coupled in the computer with the supplementary values from the additional sensor. The necessary control voltages are calculated by the computer in accordance with the predetermined rated value and are fed to the control system 8. The adjustment system 10, by means of which the attitude of the aircraft is brought from the actual value of the predetermined rated value, is activated by means of the control system 8. As shown in FIG. 4 the computer routine decides from the input data for the earth magnetic field and the heading in which heading segments the aircraft operates. Depending on this decision the input data are treated using either the equation set (4) and the value 8 derived from he additional sensor 4 or the equation set (5) and the value $\phi$ derived from the additional sensor 4. Computing in the first case $\Delta\phi$ and $\Delta\psi$ and in the second case $\Delta\theta$ and $\Delta\psi$ thus leading in both cases to the outputs $\Delta\theta$, $\Delta\phi$ and $\Delta\psi$ fed to the control system 8.

Since the data of the earth's magnetic field can be regarded as approximately constant over a geographical range of latitude of 200 to 250 km, the steering and stabilisation system according to the invention operates with sufficient accuracy over this range if data for the earth's magnetic field at the centre of the operating region are provided as standard values. It is also possible to feed in data of the earth's magnetic field relating to a plurality of regions and then to switch to the relevant values in each case according to the position of the aircraft at the time.

It is sufficient in many cases to make the co-ordinate transformation linear according to a predetermined flight attitude, for example in horizontal straight-line flight. Such a linear transformation will then allow the use of an electrical resistance network for the coordinate transformation.

Figure 5:
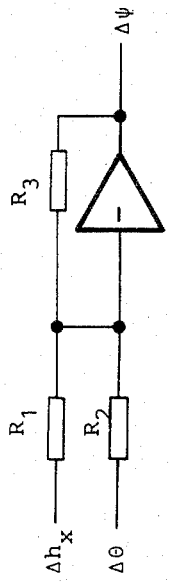
FIG. 5 shows a resistor network for the coordinate transformation.

At a given course $\psi_o$ a linear relationship exists between the values $\Delta\theta$, $\Delta\phi$, $\Delta\psi$ and the values $\Delta h_x$, $\Delta h_y$ and $\Delta h_z$, corresponding to the equations (4) and (5). Therefore a co-ordinate transformation can occur f.e. carried out by means of a simple resistor network with three resistors $R_1$, $R_2$ and $R_3$ in connection with an operation amplifier shown in FIG. 5. Resistor $R_1$ is connected to the output of one of said magnetometer sensors 2 and resistor $R_2$ to the output of the additional sensor 4. Both resistor $R_1$ and $R_2$ are connected to the input of the operation amplifier. The third resistor $R_3$ bypasses the operation amplifier, the output of which is the value $\Delta\psi$. The values of the resistors are rated according to the follows equations:

$$\Delta\psi = -\frac{R_3}{R_1} \cdot \Delta h_x - \frac{R_3}{R_2} \Delta\theta \quad (6)$$

$$\frac{R_3}{R_1} = \frac{1}{t \cdot \sin\psi_o} \quad \frac{R_3}{R_2} = \frac{i}{t \cdot \sin\psi_o} = i \cdot \frac{R_3}{R_1} \quad (7)$$

The resistors can be trimmers enabling the network to be adjusted in accordance with a given $\psi_o$.

The use of such a network leads to a significant reduction in the computer capacity necessary and the network can even replace the computer in case of a system for a vehicle designed only for horizontal straight-line flight mission.

Figure 6:
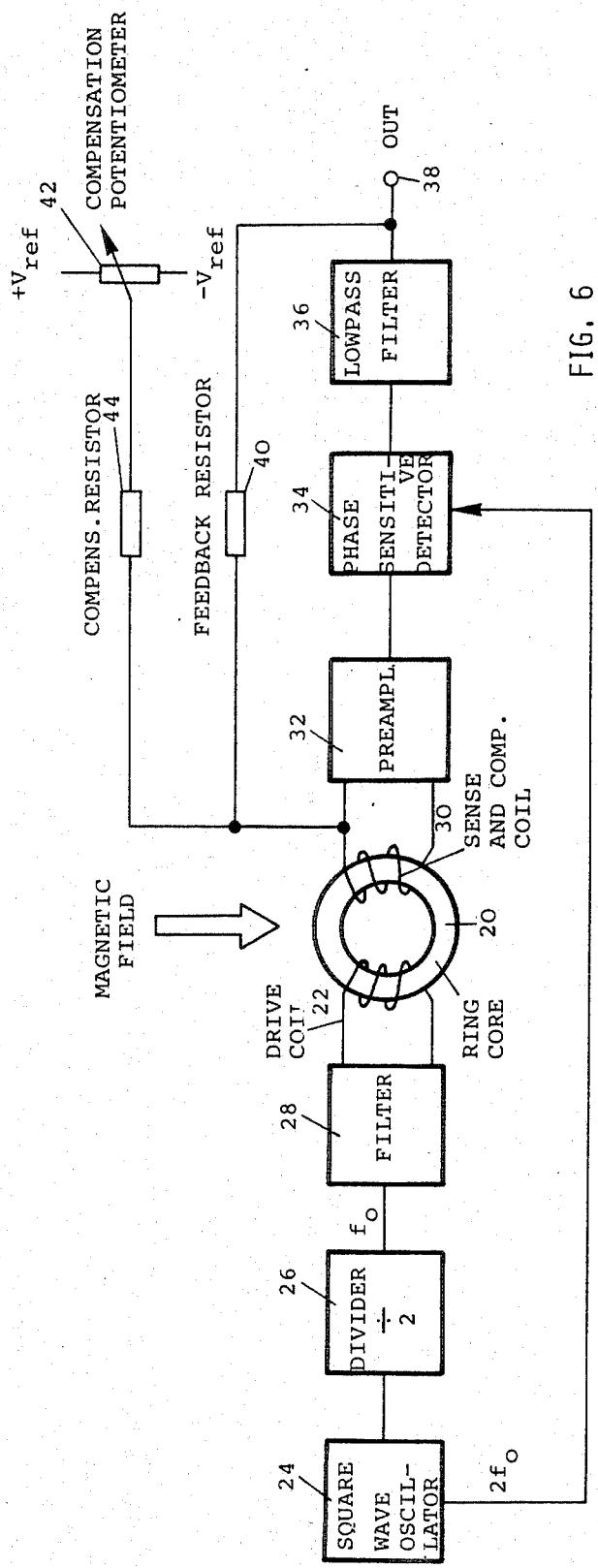
FIG. 6 is a block diagram of a ring core magnetometer.

FIG. 6 is the block diagram of a ring core magnetometer. On the ring core 20 two coils are wound. The driving coil 22 is energized by a square wave oscillator 24 via a divider 26 and a filter 28. The output of the sensor coil 30 is amplified in a preamplifier treated in a phase sensitive detector and passed through a lowpass filter 36 to the output where a DC signal is available which is direct proportional to the magnetic field. The output signal is fedback to the sensor coil 30 via a feedback peristor 40. By means of a compensation potentiometer 42 a compensating DC current can be added via a compensation resistor 44 to the sensor coil 30 or a separate compensation coil which may be provided.

For determination of position deviations $\Delta\theta$, $\Delta\phi$, $\Delta\psi$ from the measured magnetic field sizes $h_x = h_{xo} + \Delta h_x$, $h_y = h_{yo} + \Delta h_y$ and $h_z = h_{zo} + \Delta h_z$, the values $h_{xo}$, $h_{yo}$, $h_{zo}$ have to be compensated which can be done in the microcomputer or directly in the magnetometer by means of said compensation potentiometer, which enables to adjust the values $h_{xo}$, $h_{yo}$ and $h_{zo}$ to the value 0. Such a compensation is of special importance in connection with a resistor network as described above as then $\psi_o$ is a constant irrespective of the actual flight attitude.

For the compensation adjustment the vehicle is brought into reference attitude position and for each single magnetometer component a zero adjustment is accomplished by means of the compensation potentiometers.

Steering and stabilisation systems as described in the foregoing example with reference to the drawing can be constructed at relatively low cost and with low space requirement. The cost of such a steering system is considerably lower than those of known steering and stabilisation systems of equivalent efficiency. The steering and stabilisation system according to the invention is therefore suitable for equipping unmanned aircraft as well as small aeroplanes.

The steering and stabilisation system, described in the foregoing example with application to an aircraft, can also be used for ships, and in particular for small boats, such as sailing boats, which are subject to large rolling motion and in which the normal magnetic compass is not sufficient to achieve a determination of course with the necessary accuracy.

In stabilisation systems, a certain rate of change in attitude angle is frequently required in order to achieve a sufficient dynamic stability. For this purpose so-called induction coils may advantageously be provided.

The output voltage of an induction coil magnetometer is proportional to the time derivative of the magnetic field. If the magnetic field changing velocities are measured by a 3-axis-induction coil magnetometer, one obtains by corresponding co-ordinate transformation under use of a further additional sensor the following values $$\Delta\dot{\theta} = \frac{d\Delta\theta}{dt}; \quad \Delta\dot{\phi} = \frac{d\Delta\phi}{dt}; \quad \Delta\dot{\psi} = \frac{d\Delta\psi}{dt}$$

In a vehicle with course- and attitude control the values $\Delta\dot{\theta}$, $\Delta\dot{\phi}$, $\Delta\dot{\psi}$ are adjusting the damping factor of the control circuit.

The output signals of a triple induction coil 14, mounted in a fixed position in the vehicle, are subjected to the same co-ordinate transformation as the output signals of the magnetometers 2.

It is however, also possible to obtain the supplementary signals by means of time differentiation of the signals of the additional sensor 4 of additude. The time differentation of these signals can be calculated in the micro-computer or by means of an additional electronic circuit.

We claim:

1. A steering and stabilization system for a vehicle including means for the determination of attitude of the vehicle comprising at least two magnetometers mounted in the vehicle and fixed with respect to the direction of the fore-and-aft axis thereof as to determine each coordinate of a set of three orthogonal coordinates of attitude of the vehicle, and an additional sensor of attitude to provide supplementary information relating to one of the coordinates of attitude determined by said magnetometers, each of said magnetometers being provided with means for inducing a compensating current to its magnetic core for a null point adjustment of its magnetic field for the attitude required for a predetermined course of the vehicle, the system also including a microcomputer on board of said vehicle including input means to receive and store data of the earth's magnetic field, namely the inclination, declination and total intensity, relating to the operational region of the vehicle, as well as data of a predetermined course for said vehicle, and further including input means for the output signals of said magnetometers and said additional sensor, said microcomputer being programmed for the transformation of the orthogonal coordinates determined by said magnetometers into respective geodetic coordinates by said computer during use of the system, for coupling of signals representative of said transformed coordinates with signals representative of said supplementary information and calculating and generating control signals for the steering and stabilization system of the vehicle and for adjustment of said compensating current depending on the attitude required.

2. A steering and stabilisation system according to claim 1 in which there are two said magnetometers pivotally mounted in the vehicle for turning about an axis of yaw and fixed with respect to the direction of the fore-and-aft axis as to determine said three orthogonal co-ordinates of attitude of the vehicle.

3. The steering and stabilisation system according to claim 2, in which the programme of the course of motion is dependent on time and/or on location and/or on route.

4. The steering and stabilisation system according to claim 1, in which the core of each said magnetometer is provided with means for compensating the output of the sensor coil, by a compensating current derived from a compensation potentiometer.

5. The steering and stabilisation system according to claim 4, in which the core of each said magnetometer is provided with a compensating coil being fed by said compensating current.

6. The steering and stabilisation system according to claim 1 including means generating supplementary signals depending of the rate of change in angle of attitude and time differentials said signals being fed into the micro computer for damping purposes.

7. The steering and stabilisation system according to claim 1, additionally including an induction coil co-ordinated with a generator of supplementary signals representative of rate of change in an angle of attitude of the vehicle, said supplementary signals being fed into the micro computer for damping purposes.

8. A steering and stabilization system for a vehicle including means for the determination of attitude of the vehicle comprising at least two magnetometers mounted in the vehicle and fixed with respect to the direction of the fore-and-aft axis thereof as to determine each co-ordinate of a set of three orthogonal co-ordinates of attitude of the vehicle, and an additional sensor of attitude to provide supplementary information relating to one of the co-ordinates of attitude determined by said magnetometers, the system also including a resistor network with three resistors in connection with an operation amplifier, two of the resistors being connected to the output of the magnetometer and the outut of the additional sensor, said two resistors being connected to the input of the operation amplifier whereas the third resistor is bypassing the operation amplifier, the output of the operation amplifier being connected with the input of a control system for said vehicle, said operational amplifier being operative for producing control signals for said control system, whereby said steering and stabilization system is operative for controlling the adjustment system of the vehicle.

9. The steering and stabilisation system according to claim 8, in which each said magnetometer is provided with means for a magnetic field null point compensation.

* * * * *